United States Patent
Geveci et al.

(10) Patent No.: US 9,115,630 B1
(45) Date of Patent: Aug. 25, 2015

(54) DIAGNOSTIC FOR A MID-CATALYST NH3 SENSOR

(71) Applicant: Cummins Inc., Columbus, IN (US)

(72) Inventors: Mert Geveci, Delmar, NY (US); Feng Liu, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/268,442

(22) Filed: May 2, 2014

(51) Int. Cl.
*F01N 3/00* (2006.01)
*F01N 3/10* (2006.01)
*F01N 11/00* (2006.01)
*F01N 3/20* (2006.01)
*B01D 53/94* (2006.01)
*F01N 13/00* (2010.01)
*F02D 41/22* (2006.01)

(52) U.S. Cl.
CPC .......... *F01N 11/002* (2013.01); *B01D 53/9495* (2013.01); *F01N 3/208* (2013.01); *F01N 3/2066* (2013.01); *F01N 11/00* (2013.01); *F01N 13/0093* (2014.06); *F02D 41/222* (2013.01); *B01D 2255/00* (2013.01); *F01N 2560/021* (2013.01); *F01N 2560/026* (2013.01)

(58) Field of Classification Search
CPC ... F01N 3/2066; F01N 11/00; F01N 13/0093; F01N 2560/021; F01N 2560/026; F01N 2560/14; F02D 41/222
USPC ..................................... 60/276, 277, 295, 301
See application file for complete search history.

(56) References Cited

U.S. PATENT DOCUMENTS

| | | | |
|---|---|---|---|
| 7,810,313 B2 | 10/2010 | Stewart et al. | |
| 2008/0022658 A1* | 1/2008 | Viola et al. | 60/286 |
| 2010/0024390 A1 | 2/2010 | Wills et al. | |
| 2010/0101214 A1 | 4/2010 | Herman et al. | |
| 2010/0180576 A1 | 7/2010 | Wang et al. | |
| 2010/0241340 A1 | 9/2010 | Weber et al. | |
| 2010/0326051 A1 | 12/2010 | Busch et al. | |
| 2011/0041480 A1* | 2/2011 | Yasui et al. | 60/286 |
| 2011/0072798 A1* | 3/2011 | Herman | 60/286 |
| 2011/0265452 A1* | 11/2011 | Geveci et al. | 60/274 |
| 2012/0233986 A1* | 9/2012 | Geveci et al. | 60/274 |
| 2012/0234077 A1* | 9/2012 | Wang et al. | 73/23.31 |
| 2013/0104530 A1* | 5/2013 | Geveci | 60/301 |

* cited by examiner

*Primary Examiner* — Audrey K Bradley
(74) *Attorney, Agent, or Firm* — Taft Stettinius & Hollister LLP

(57) ABSTRACT

A system and method are disclosed for a selective catalytic reductant (SCR) catalyst with an $NH_3$ sensor operationally coupled mid-catalyst of the SCR catalyst and a controller in electronic communication with the $NH_3$ sensor configured to interpret a diagnostic enablement condition of the $NH_3$ sensor. The controller is configured to control a reductant injector to inject varying reductant amounts over a range of ANR values in response to the enablement condition being satisfied. The controller also is configured to determine a lower bound of estimates of the $NH_3$ amount at the mid-bed catalyst position for the reductant amounts, and determine an $NH_3$ sensor fault condition in response to actual sensor outputs and the $NH_3$ lower bound value.

20 Claims, 7 Drawing Sheets

DIAGNOSTIC FOR A MID-CATALYST NH3 SENSOR

FIELD OF THE INVENTION

The present application generally relates to exhaust aftertreatment systems of internal combustion engine diesel exhaust systems, and more particularly to exhaust aftertreatment systems that include a selective catalytic reduction (SCR) catalyst to control exhaust system emissions and a mid-catalyst ammonia ($NH_3$) sensor included as a control element.

BACKGROUND

Exhaust aftertreatment systems typically include one or more exhaust treatment catalyst elements, including diesel oxidation catalysts (DOC), diesel particulate filters (DPF), and SCR catalysts. Certain exhaust aftertreatment systems may rely on the $NH_3$ sensor as a control element. A failure in the $NH_3$ sensor may significantly impact the control of the exhaust aftertreatment system relying upon the $NH_3$ sensor. Because the exhaust aftertreatment system relies upon the $NH_3$ sensor outputs in certain applications, diagnosis of a faulty or failing sensor can be used to isolate the cause of a faulty or performance condition of the aftertreatment system and take appropriate corrective actions.

SUMMARY

One embodiment is a unique method for determining a fault condition of an $NH_3$ sensor in an exhaust aftertreatment system. Other embodiments include systems and methods for diagnosing a mid-catalyst $NH_3$ sensor. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
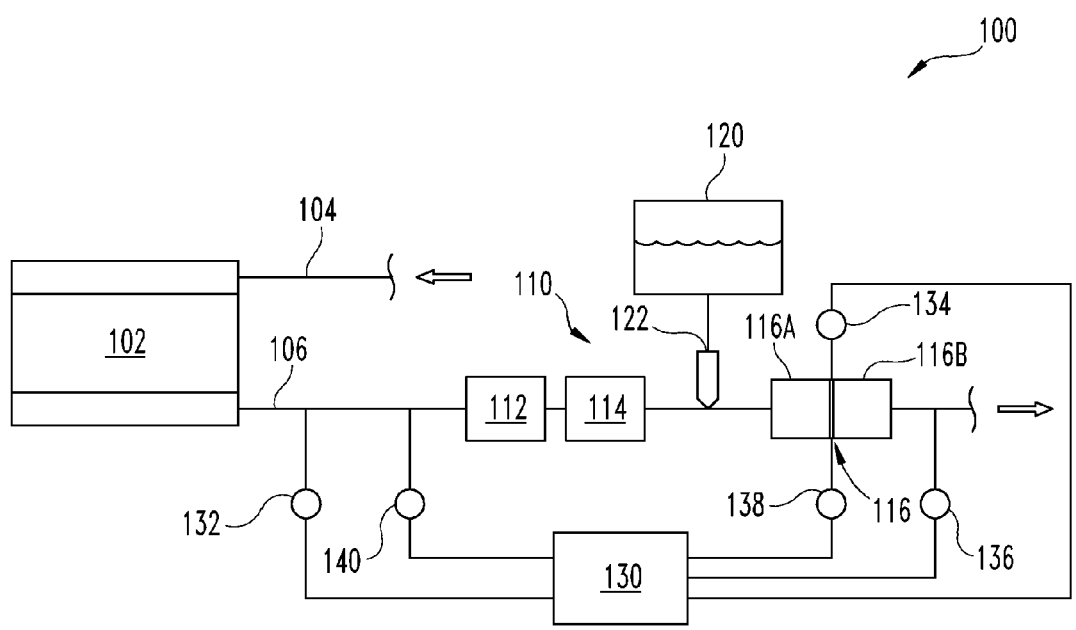
FIG. 1 is a schematic of an internal combustion engine system including and exhaust aftertreatment system including an SCR catalyst with a mid-catalyst $NH_3$ sensor.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a system 100 that includes an exhaust aftertreatment system 110. System 100 may be provided on a vehicle powered by an engine 102. The engine 102 may be any type of engine understood in the art, including a diesel, gasoline, turbine, etc., that produces $NO_x$ gases during operation and may be utilized in such applications as vehicles, machinery, power generation or pumping systems, for example. Engine 102 includes an intake system 104 through which charge air enters and an exhaust system 106 through which exhaust gas resulting from combustion exits, it being understood that not all details of these systems that are typically present are shown. Before entering the atmosphere, however, the exhaust gas is treated by one or more aftertreatment devices in the exhaust aftertreatment system 110.

The exhaust system 106 includes the exhaust aftertreatment system 110 having at least one selective catalytic reduction (SCR) catalysts 116 fluidly disposed in the exhaust system. The SCR catalyst 116 includes a first or upstream catalyst portion 116A that, for example, forms a first catalyst bed toward the engine and a second or downstream catalyst portion 116B that forms a second catalyst bed away from the engine. The exhaust aftertreatment system 110 may also include one or more diesel oxidation catalysts (DOC) 112 and one or more diesel particulate filters (DPF) 114 upstream of the SCR catalyst 116. In certain embodiments, one or more of the DOC 112 and/or the DPF 114 may not be present, may be located in different locations than what is shown in FIG. 1, and/or may be provided at multiple locations.

One or more sensors may be positioned throughout the system 100 to provide signals indicating certain system 100 conditions, such as exhaust gas constituent, flow rate, temperature, and pressure signals, for example. In the illustrated embodiment, the system 100 includes a first or engine out $NO_x$ sensor 132 operationally coupled to the exhaust system 106 at a position upstream of the exhaust aftertreatment system 110, and a second or system out $NO_x$ sensor 136 operationally coupled to the exhaust system 106 at a position downstream of the SCR catalyst 116. The first $NO_x$ sensor 132 provides an engine-out $NO_x$ amount and may be positioned anywhere in the exhaust stream that is upstream of the SCR catalyst 116 and downstream of the internal combustion engine 102 to provide the engine-out $NO_x$ amount. The second $NO_x$ sensor 136 provides a system output $NO_x$ amount and may be positioned anywhere in the exhaust stream that is downstream of the SCR catalyst 116. Sensors 132, 136 may be physical sensors, or virtual sensors that provide the $NO_x$ amount in response to one or more other operating parameters.

The system 100 further includes an exhaust flow rate sensor 140 and an $NH_3$ sensor 134, each operationally coupled to the exhaust system 106. The exhaust flow rate sensor 140 is operable to provide a signal indicating the flow rate of diesel exhaust (i.e. mass flow rate) in the exhaust system 106. The $NH_3$ sensor 134 is positioned at the mid-bed of the SCR catalyst 116 (i.e. between the first and second SCR catalyst portions 116A, 116B), operable to provide an $NH_3$ composition value at the mid-bed location. A mid-bed location can include a location in which the catalyst portions 116A, 116B have the same size upstream and downstream of $NH_3$ sensor 134, or where catalyst portions 116A, 116B have different sizes.

The system 100 also includes the capability to determine one or more temperatures of the SCR catalyst 116 and exhaust gas in exhaust system 106, which may include one or more temperature sensors 138 and/or temperature models. The temperature sensor 138 is illustrated at the mid-bed location of the SCR catalyst 116 in FIG. 1 to provide a signal indicating the mid-bed temperature of the SCR catalyst 116. The temperature sensor 138 and/or other temperature sensors may be additionally and/or alternatively located upstream and/or downstream of the SCR catalyst 116. Furthermore, the temperature at any one location of SCR catalyst 116 of the aftertreatment system may be inferred, calculated, averaged or otherwise determined from one or more sensors at other location(s) in the exhaust system 106. The first $NO_x$ sensor 132, the second $NO_x$ sensor 136, the exhaust flow rate sensor 140, and the SCR catalyst mid-bed temperature sensor 138 need not be in direct communication with exhaust system 106, and can be located at any position within exhaust system 106 that provides a suitable indication of applicable exhaust system 106 readings.

In the illustrated embodiment, a reductant injector 122 is operationally coupled to the exhaust system 106 at a position upstream of the SCR catalyst 116 with an outlet arranged to spray a reductant into the exhaust system 106 where it mixes with the engine exhaust gas produced by the engine 102. The SCR catalyst 116 promotes a chemical reaction between the reductant and $NO_x$ in the exhaust gas that converts substantial amounts of $NO_x$ to reduce $NO_x$ emissions before the exhaust gas passes into the atmosphere. As used herein, injector includes any nozzle, static device, electronically controllable device, and/or mechanical actuator that provides an outlet for reductant delivery. The reductant injector 122 is fluidly coupled to a reductant source 120. In certain embodiments, the reductant source 120 may include a storage tank for storing a liquid reductant or a housing for storing a dry reductant in a solid storage media that is released in gaseous form when heated. The reductant may be any type of reductant utilized in an exhaust aftertreatment system that results in ammonia being utilized as the final reductant—including at least ammonia (gaseous or aqueous) and urea.

The system 100 may further include hardware and other components or arrangements that are not illustrated in FIG. 1, but that are nevertheless contemplated herein. For example, the exhaust aftertreatment system 110 may include one or more other aftertreatment components not shown, such as an ammonia slip catalyst, an ammonia oxidation (AMOX) catalyst, and various temperature, pressure, and exhaust gas constituent sensors. In other embodiments, the exhaust system 106 may include various components not shown, such an exhaust gas recirculation (EGR) system, a turbocharger system, coolers, and other components connecting the exhaust system 106 to the intake system 104. The addition and/or substitution of one or more of such components is well known in the art, and as such is not described further except where specific operations or procedures herein utilize such components.

The system further includes a controller 130 structured to perform certain operations to diagnose a fault condition of the $NH_3$ sensor 134. In certain embodiments, the controller 130 forms a portion of a processing subsystem including one or more computing devices having memory, processing, and communication hardware. The controller 130 may be a single device or a distributed device, and the functions of the controller 130 may be performed by hardware or software. The controller 130 is in communication with any sensor, actuator, or component of the system 100 to perform the operations described herein. For example, in FIG. 1 the controller 130 is in communication with sensors 132, 134, 136, 138, and 140. Controller 130 is also in communication with engine 102 and the reductant injector 122. Communication may be direct, electronic, hard-wired, wireless, over a network, and/or over a datalink. The controller 130 may be a part of or in communication with an engine controller (not shown), commonly referred to as an engine control unit (ECU) or engine control module (ECM), and may receive and interpret engine operating parameters from the engine controller.

Figure 2:
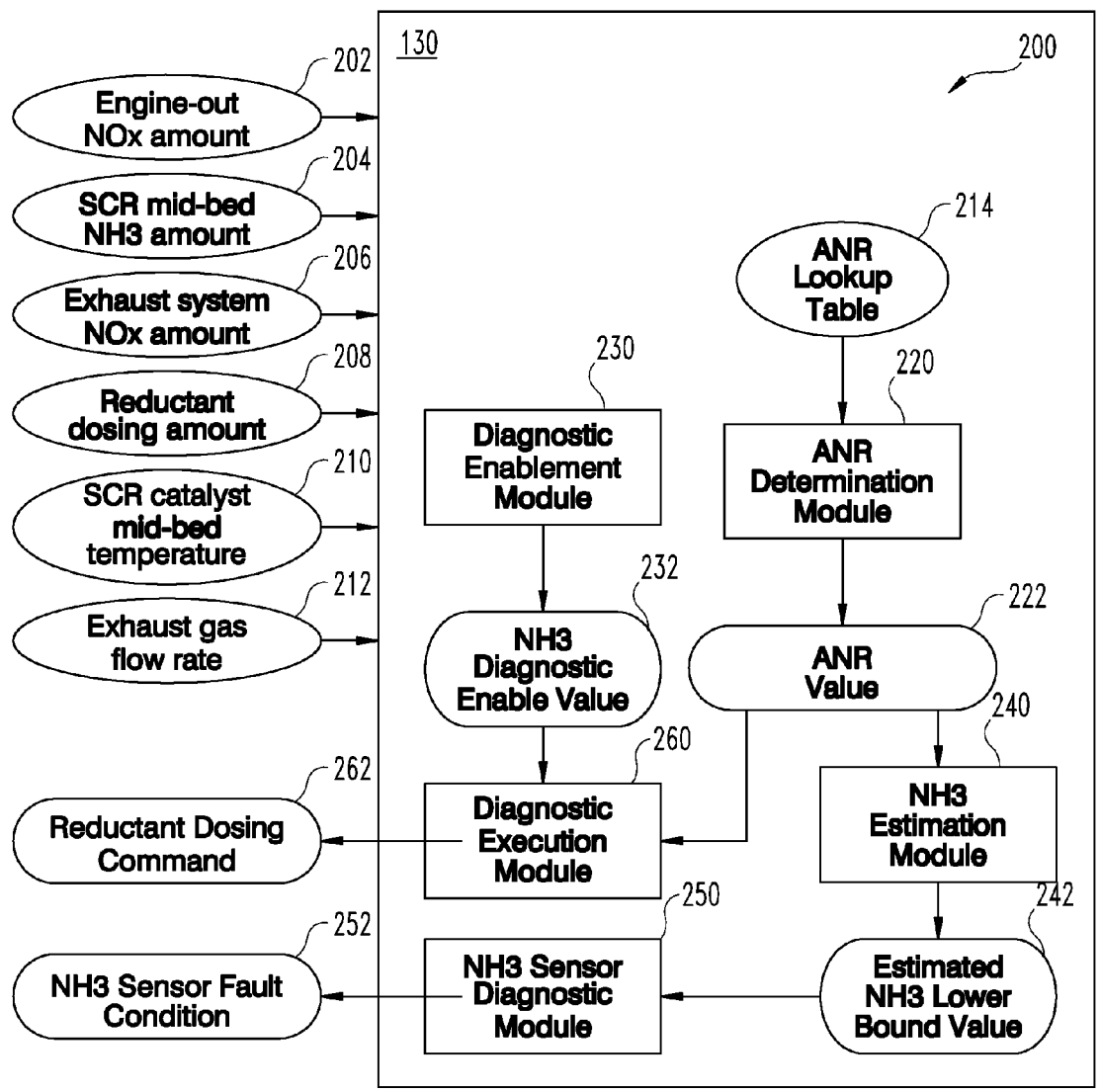
FIG. 2 is a schematic diagram of a controller structured to functionally execute operations to diagnose a fault condition of the mid-catalyst $NH_3$ sensor.

One exemplary embodiment of controller 130 is shown in FIG. 2. In certain embodiments, the controller 130 receives various inputs from the sensors including an engine-out $NO_x$ amount 202 from first $NO_x$ sensor 132 or from parameters indicative thereof, an SCR mid-bed $NH_3$ amount 204 from $NH_3$ sensor 134, an exhaust system output $NO_x$ amount 206 from second $NO_x$ sensor 136, a reductant dosing amount 208, an SCR catalyst mid-bed temperature 210 from temperature sensor 138 or from parameters indicative thereof, and an exhaust flow rate 212 from flow rate sensor 140 or from parameters indicative thereof. It should be appreciated that any and/or all of the controller inputs may be measured, modeled, and/or calculated.

The controller 130 further includes an ammonia to $NO_x$ ratio (ANR) determination module 220, a diagnostic enablement module 230, an $NH_3$ estimation module 240, and an $NH_3$ sensor diagnostic module 250. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or on non-transitory computer readable medium, and modules may be distributed across various hardware components. Certain embodiments of the controller 130 may not utilize all of the modules or reference all of the data illustrated in FIG. 2.

Certain operations herein are described as interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transitory computer readable medium, receiving the value as a run-time parameter by any means known in the art, and/or by receiving a value by which the interpreted parameter can be calculated, and/or by referencing a default value that is interpreted to be the parameter value.

The ANR determination module 220 is configured to determine an ANR value 222 to the inlet of SCR catalyst 116 that is based on one or more of the controller 130 inputs such as the engine-out $NO_x$ amount 202. In certain embodiments the ANR determination module 220 may determine the ANR value 222 from an ANR lookup table 214 based on the SCR catalyst mid-bed temperature 210 and engine out $NO_x$ amount 202. The ANR value 222 may include a range of diagnostic ANR values that range from 1.1 to 2.0 times the stoichiometric ANR value, which are used to determine various reductant amounts for injection during the $NH_3$ sensor diagnostic.

The diagnostic enablement module 230 is configured to determine whether a diagnostic enablement condition exists and to provide an $NH_3$ diagnostic enable value 232 based at least in part on one or more of the controller 130 inputs, such as SCR catalyst mid-bed temperature 210 and exhaust gas flow rate 212. Under certain low exhaust gas flow and high SCR catalyst temperature conditions, a deNO$_x$ (i.e. a NO$_x$ removal) reaction across SCR catalyst 116 may complete in response to reductant being injected at a stoichiometric ANR amount before the exhaust gas flow reaches the NH$_3$ sensor 134. These conditions allow for a diagnostic to be performed on the NH$_3$ sensor by injecting reductant amounts that correspond to various diagnostic ANR values greater than 1, and comparing the estimated NH$_3$ amount at NH$_3$ sensor 134 with the actual sensor readings. In certain embodiments, the diagnostic enablement condition may include the SCR catalyst mid-bed temperature 210 being greater than a high temperature threshold, a steady state condition for the SCR catalyst mid-bed temperature 210, and/or the exhaust flow rate 212 being less than a low exhaust flow rate threshold.

The NH$_3$ estimation module 240 is configured to receive and interpret the ANR value(s) 222 from the ANR determination module 220 in response to a diagnostic enable condition indicated by NH$_3$ diagnostic value 232. NH$_3$ estimation module 240 is further configured to calculate estimated NH$_3$ lower bound value 242 for the output of NH$_3$ sensor 134 based on each of the diagnostic ANR values 222 and the engine-out NO$_x$ amount 202 when the NH$_3$ diagnostic enable value 232 is received. In one embodiment, the estimated NH$_3$ lower bound value 242 is determined by:

$$NH_{3\ mid\text{-}bed} = NO_{x\ engine\text{-}out} \times (ANR-1) \quad \text{Equation 1}$$

where NH$_{3\ mid\text{-}bed}$ is an estimated lower bound NH$_3$ concentration at the mid-bed of SCR catalyst 16, NO$_{x\ engine\text{-}out}$ is the amount of NO$_x$ upstream of the SCR catalyst 116, and ANR is the diagnostic ANR at an inlet of the SCR catalyst 116. Equation 1 provides an estimate of the lower bound of the NH$_3$ sensor values by accounting for the possibility the deNO$_x$ reaction may not be complete at the location of NH$_3$ sensor 134. It should be appreciated that in certain embodiments the Equation 1 variables may be measured, calculated, and/or modeled. In certain embodiments the estimated lower bound NH$_3$ amount may be filtered, such as by a low pass filter, for example. In another embodiment, the estimate of the lower bound of NH$_3$ amounts is filtered with the filter having a time constant selected in response to a size of the first catalyst portion and the flow rate of the exhaust gas.

The diagnostic execution module 260 is configured to receive and interpret the NH$_3$ diagnostic enable value 232 from the diagnostic enablement module 230 and the ANR value 222. The diagnostic execution module 260 is further configured to provide a plurality of reductant dosing commands 262 in response to the diagnostic enable conditions being met that are based on the diagnostic ANR values of ANR value 222. In certain embodiments, the reductant dosing command 262 is provided to a reductant injector, such as the reductant injector 122 referenced in FIG. 1. The NH$_3$ amounts are measured by NH$_3$ sensor 134 in response to each of the reductant dosing commands 262 are provided as SCR mid-bed NH$_3$ amount 204

The NH$_3$ sensor diagnostic module 250 is configured to receive the estimated NH$_3$ lower bound value 242 from the NH$_3$ estimation module 240 and the NH$_3$ amounts measured by NH$_3$ sensor 134 at each of the diagnostic ANR values executed during the sensor diagnostic to interpret an NH$_3$ sensor fault condition 252. The NH$_3$ sensor fault condition is determined by comparing the actual outputs from NH$_3$ sensor 134 to the estimated NH$_3$ lower bound value 242, and indicating a fault condition in response to a deviation of the actual outputs from the estimated values. In certain embodiments, the NH$_3$ sensor diagnostic module 250 may be further configured to provide the NH$_3$ sensor fault condition 252 to an on-board diagnostic (OBD) device for displaying a feedback indicator corresponding to the NH$_3$ sensor status command.

In certain further embodiments, the determination of the sensor fault condition includes one or more operations selected from the operations consisting of: averaging a number of sensor test results, incrementing a fault counter in response to a sensor test indicating a failed sensor, and decrementing a fault counter in response to a sensor test indicating a passed sensor. In other embodiments, a sensor fault condition 252 includes indicating a sensor failure, an in-range failure, incrementing a sensor failure value, and/or setting one or more values of a set of values to indicate a failed sensor, where the set of values are averaged or otherwise aggregated to set a sensor failure indication.

Figure 3:
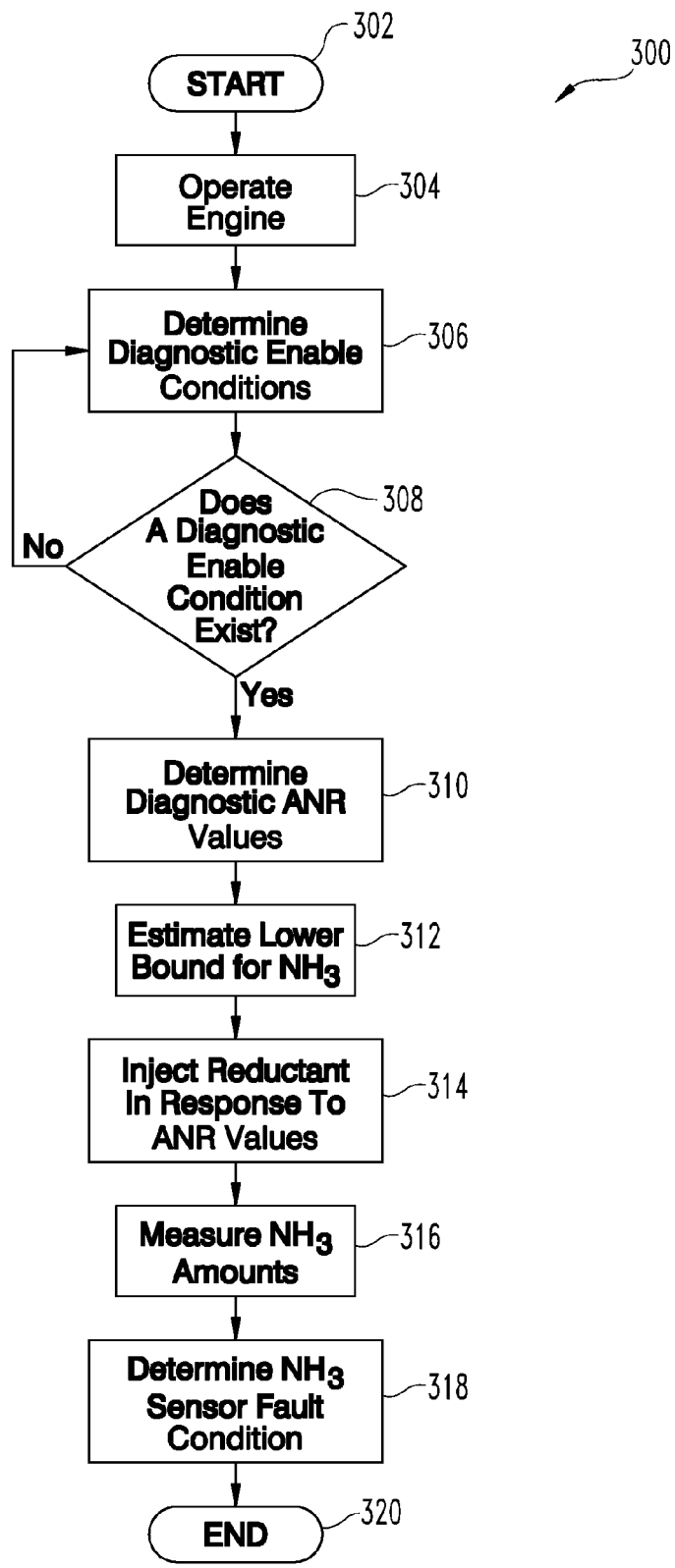
FIG. 3 is a flow diagram of a diagnostic procedure that can be performed in diagnosing a fault condition of the mid-catalyst $NH_3$ sensor.

The schematic flow diagram in FIG. 3 and related description which follows provides an illustrative embodiment of performing procedures for diagnosing an NH$_3$ sensor fault condition. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

With reference to FIG. 3, there is illustrated a flow diagram of a procedure 300 for diagnosing NH$_3$ sensor 134 that may be put into operation by programming into controller 130 for use in, for example, system 100. Procedure 300 begins at start 302 in response to, for example, a key on-event, a predetermined diagnostic start condition being initiated such an elapsed time or period of operation since a last diagnostic, or other diagnostic starting indicator by an operator or service technician. Procedure 300 continues to operation 304, where the internal combustion engine is operated to produce an exhaust gas flow across SCR catalyst 116.

From operation 304, procedure 300 continues at operation 306 to determine the diagnostic enable conditions associated with operation of the engine. In certain embodiments, the exhaust system parameters may include an exhaust flow rate, an engine-out NO$_x$ amount, and an SCR mid-bed temperature. Procedure 300 continues from operation 306 at conditional 308 to determine whether a diagnostic enable condition exists based on the operating parameters interpreted in operation 306. In certain embodiments, the diagnostic enable condition may include a temperature value of an inlet portion and/or mid-bed portion of the SCR catalyst being greater than a high temperature threshold, a steady state condition for the temperature value of the SCR catalyst, and/or the exhaust flow rate being less than a low flow rate threshold. In one embodiment, the high temperature threshold is a temperature value that is greater than 300° C. In another embodiment, the high temperature threshold is a temperature value greater than 350° C. In yet another embodiment, the low flow rate threshold is an exhaust flow rate that is moderate or low, such as less than 50% of a maximum exhaust flow rate. Under these conditions, the deNO$_x$ reaction across SCR catalyst 116 is complete or substantially complete at the mid-bed location of NH$_3$ sensor 134. If it is determined that a diagnostic enable condition does not exist, procedure 300 returns to operation 306. If it is determined that a diagnostic enable condition exists, procedure 300 continues at operation 310.

At operation 310, the diagnostic ANR values are determined including a plurality of diagnostic ANR values that are greater than 1.0. In one embodiment, the diagnostic ANR values range from 1.1 to 2.0. Since the $deNO_x$ reaction across SCR catalyst is substantially complete under the diagnostic enable conditions, ammonia amounts supplied in excess of the diagnostic ANR values should be read by $NH_3$ sensor 134.

Procedure 300 continues at operation 312 to determine an estimate of the lower bound of the $NH_3$ amounts at the mid-bed location based on Equation 1 above. In Equation 1 a lower bound of the $NH_3$ amounts at the mid-bed location is provided by accounting for the possibility that the $deNO_x$ reaction may not be complete. In certain embodiments, the estimates for the lower bound of the $NH_3$ amounts may be filtered, such as by a low pass filter, for example.

Procedure 300 continues at operation 314 to inject reductant amounts corresponding to the diagnostic ANR values with reductant injector 122 while the diagnostic enable conditions are satisfied. Procedure 300 further includes an operation 316 to measure the $NH_3$ amounts with $NH_3$ sensor 134 during the diagnostic. At operation 318, procedure 300 includes determining a fault condition of the $NH_3$ sensor in response to a comparison of the $NH_3$ amounts measured at operation 316 and the estimate of the lower bound of $NH_3$ amounts across the diagnostic ANR values determined at operation 314. A failure condition can be indicated in response to a deviation of the measured values from the estimated values by more than a threshold amount. Other fault conditions can also be indicated, including a passed condition, an in-range low condition, a fault flag that is accumulated with other fault determinations before determining a failure condition, or other suitable indicator of the deviation between the estimated and measured amounts. It is contemplated that in certain embodiments the $NH_3$ sensor fault condition may be provided to an on-board diagnostic (OBD) device. Procedure 300 ends at 320.

Figure 4A:
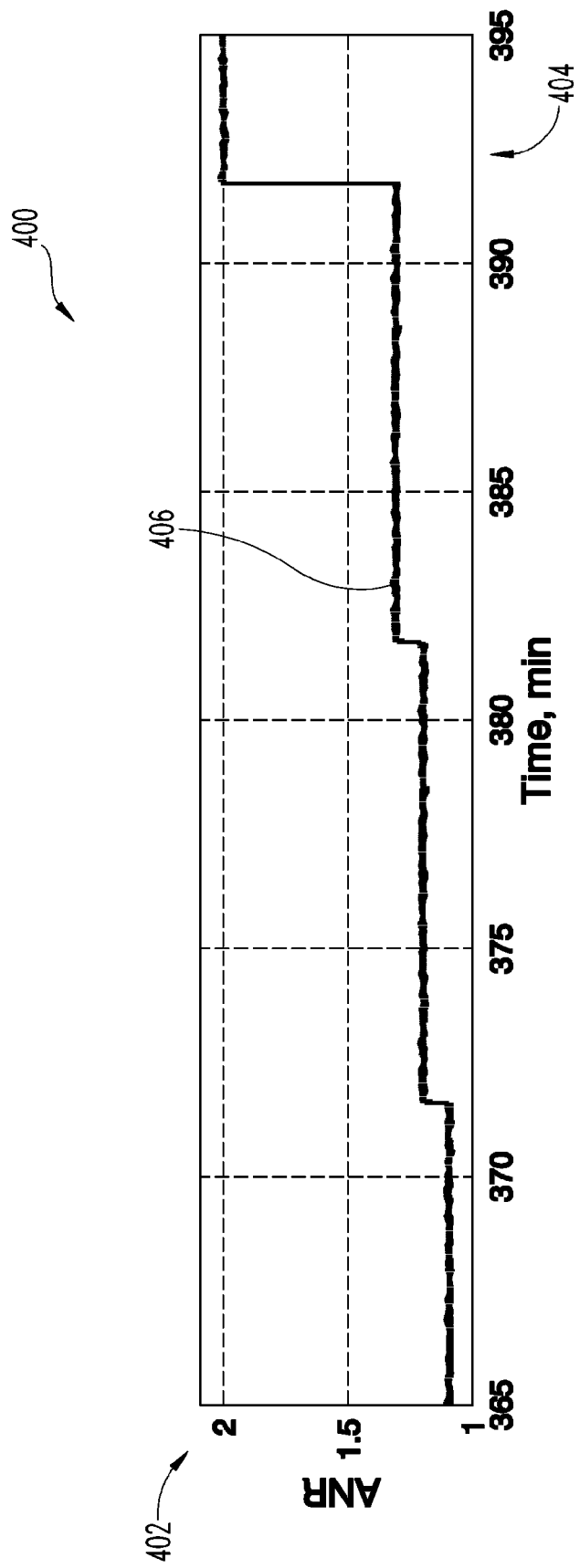
FIGS. 4A-4C are graphs of time trajectories for the ANR, engine-out $NO_x$ amount, and the mid-catalyst $NH_3$ sensor output and estimate of the mid-cat $NH_3$ amount, respectively, of an exemplary diagnostic.
Figure 4B:
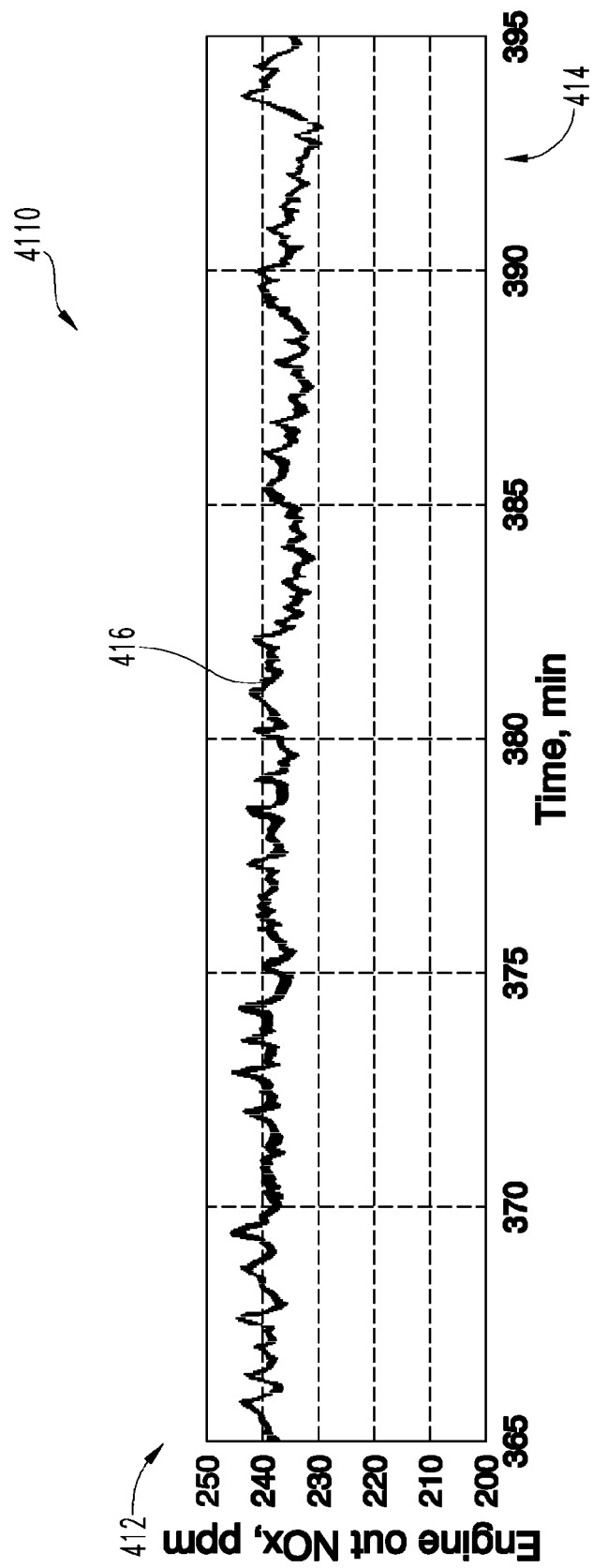
Figure 4C:
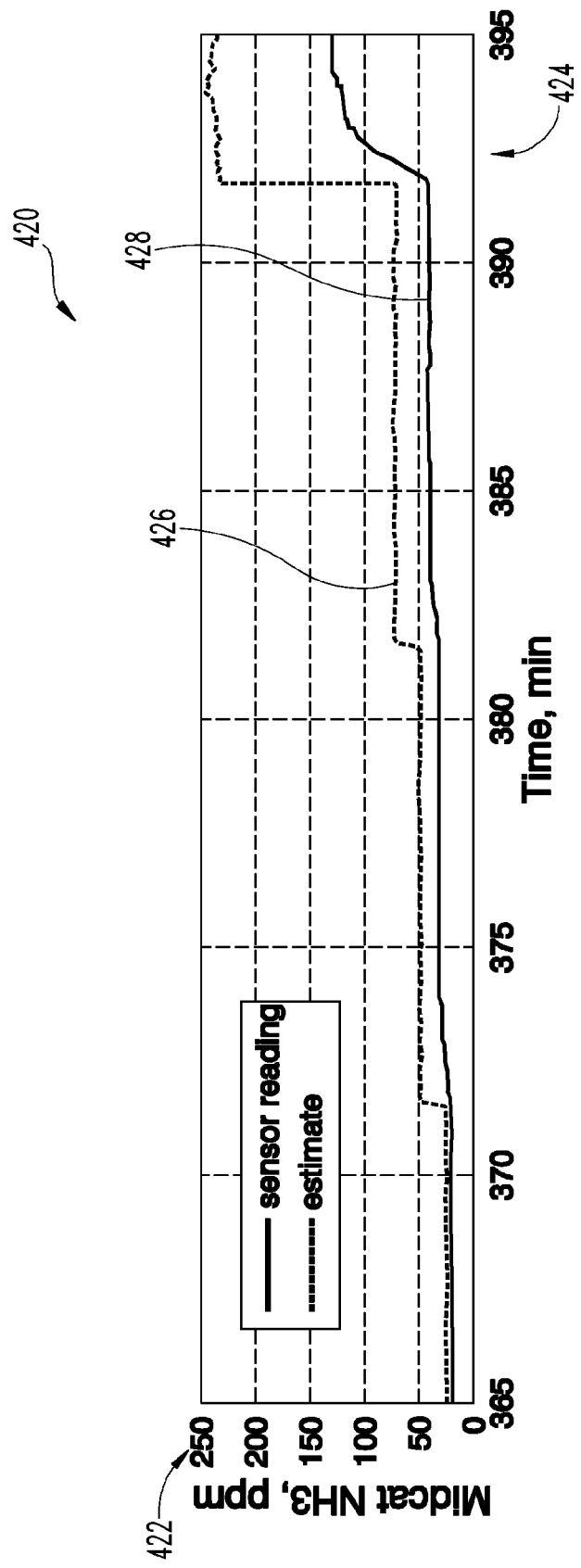

With reference to FIGS. 4A-4C, graphs 400, 410, 420 are provided that display a time trajectory of test results for an exemplary diagnostic of a mid-bed $NH_3$ sensor according to the systems and methods disclosed herein. In the test of FIGS. 4A-4C, the engine was operating at 1590 rpm and 577 ft-lb of horsepower with the inlet temperature of an SCR catalyst, such as the SCR catalyst 116 described in FIG. 1, stabilized near 390° C. and an exhaust flow rate stabilized near 230 g/sec. The graph 400 in FIG. 4A includes inlet ANR values along y-axis 402 and a time in minutes along x-axis 404. Graph 400 further includes a diagnostic test parameter 406 of the diagnostic ANR sweeping from 1.1 to 2.0, from which estimates of the lower bound of $NH_3$ mid-bed amounts may be estimated using Equation 1.

The graph 410 in FIG. 4B includes an engine out $NO_x$ in parts per million (ppm) along y-axis 412 and a time in minutes along x-axis 414. The graph 410 further includes the engine out $NO_x$ amounts 416 during the diagnostic. The graph 420 in FIG. 4C includes a mid-bed $NH_3$ amount (i.e. an $NH_3$ amount at the mid-bed of the SCR catalyst 116) in ppm along y-axis 422 and a time in minutes along x-axis 424. The graph 420 further includes the estimated lower bound $NH_3$ amount 426 as a function of the engine out $NO_x$ amounts and the diagnostic ANR values, and a measured $NH_3$ amount 428 from $NH_3$ sensor 134.

Figure 5:
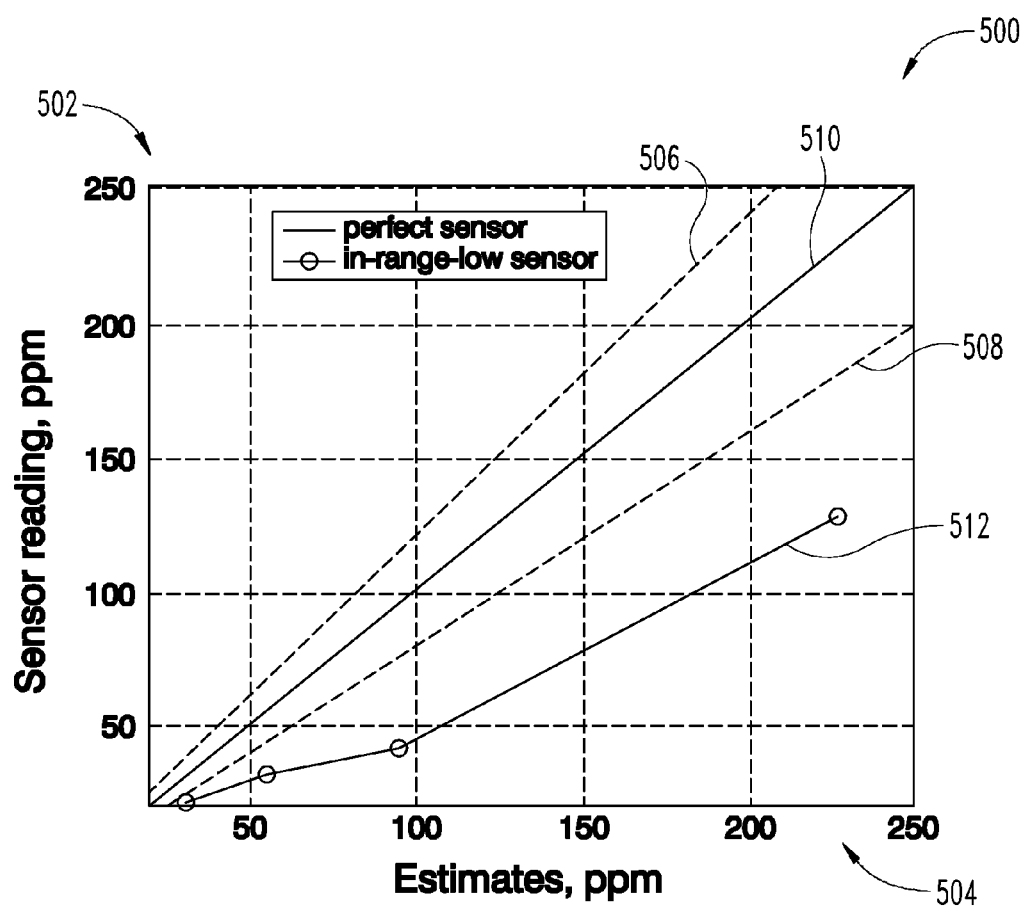
FIG. 5 is a graph showing the $NH_3$ sensor outputs relative to an estimated lower bound of the mid-catalyst $NH_3$ sensor outputs during the diagnostic.

With reference to FIG. 5, a graph 500 displays the difference between an $NH_3$ sensor reading amount for a perfect $NH_3$ sensor 134 and the estimated lower bound $NH_3$ amount. The graph 500 includes the $NH_3$ sensor reading in ppm along y-axis 502 and the estimated lower bound of the $NH_3$ amount along x-axis 504. The graph 500 further includes a perfect sensor output 510, and sensor specified deviations including an upper deviation 506 and a lower deviation 508. The deviation of the estimated lower bound for the $NH_3$ amounts 512 from the sensor lower deviation 512 indicates the sensor is reading in-range low in the FIG. 5 example.

Various aspects of the systems, apparatus, and methods are disclosed herein. For example, one aspect involves a system that includes an exhaust system for receiving an exhaust gas from operation of an internal combustion engine. The exhaust system includes an SCR catalyst include a first catalyst portion positioned upstream of a second catalyst portion, an $NH_3$ sensor coupled to the exhaust system at a position between the first and second catalyst portions operable to measure an $NH_3$ amount, a reductant injector coupled to the exhaust system at a position upstream of the first catalyst portion operable to provide a reductant amount in response to a reductant injection command, a $NO_x$ sensor upstream of the SCR catalyst configured to provide a signal representative of a $NO_x$ amount to an inlet of the first catalyst portion, and a controller.

In one embodiment, the controller includes a diagnostic enablement module structured to enable a diagnostic of the $NH_3$ sensor in response to a temperature condition of the SCR catalyst exceeding a first threshold and a flow rate of the exhaust gas being less than a second threshold, an ANR determination module structured to determine varying reductant amounts for injection by the reductant injector as based on the $NO_x$ amount in response to enablement of the diagnostic that provide a range of ANR diagnostic values, an $NH_3$ estimation module structured to determine an estimate of a lower bound of $NH_3$ amounts at the position of the $NH_3$ sensor in response to the range of ANR diagnostic values and $NO_x$ amounts at the inlet to the first catalyst portion, and an $NH_3$ sensor diagnostic module structured to determine a fault condition of the $NH_3$ sensor in response to actual $NH_3$ amounts measured by the $NH_3$ sensor over the range of ANR diagnostic values deviating from the estimate of the lower bound of the $NH_3$ amounts by more than a threshold amount.

In one embodiment, the temperature condition of the SCR catalyst is a temperature of the first catalyst portion. In a refinement of this embodiment, the temperature condition includes a temperature value of at least 350° C. in the first catalyst portion. In another embodiment, the exhaust system includes a diesel oxidation catalyst and a particulate filter upstream of the SCR catalyst.

In another embodiment, the first threshold for the temperature condition and the second threshold for the flow rate provide for substantial completion of a $deNO_x$ reaction of $NO_x$ in the exhaust gas over the first portion of the SCR catalyst. In a further embodiment, controller includes a diagnostic execution module structured to determine reductant dosing commands that provide the varying reductant amounts. In a refinement of this embodiment, the ANR diagnostic values range from about 1.1 to about 2.0.

In a further embodiment, the estimate of the lower bound of the $NH_3$ amounts is determined by the product of the $NO_x$ amount at the inlet of the first catalyst portion and the difference between an associated ANR diagnostic value and 1. In a refinement of this embodiment, the $NH_3$ estimation module is further structured to filter the estimate of the lower bound of $NH_3$ amounts. In a further refinement, the $NH_3$ estimation module is further structured to filter the estimate of the lower bound of $NH_3$ amounts with the filter having a time constant selected in response to a size of the first catalyst portion and the flow rate of the exhaust gas.

In another aspect, a method includes operating an internal combustion engine to produce an exhaust gas to an aftertreatment system including an SCR catalyst having a first catalyst portion and a second catalyst portion downstream of the first catalyst portion, the aftertreatment system including an $NH_3$ sensor at a position between the first and second catalyst portions; enabling a diagnostic of the $NH_3$ sensor in response to a temperature condition of the SCR catalyst exceeding a first threshold and a flow rate of the exhaust gas being less than a second threshold; in response to enabling the diagnostic, estimating an $NH_3$ amount at the position of the $NH_3$ sensor in response to a $NO_x$ amount to an inlet of the first catalyst portion and a diagnostic ANR value greater than 1; injecting a reductant amount into the exhaust gas in response to the diagnostic ANR value and the $NO_x$ amount to the inlet of the first catalyst portion; measuring an $NH_3$ amount with the $NH_3$ sensor in response to injecting the reductant amount; and determining a fault condition of the $NH_3$ sensor in response to a deviation of the measured $NH_3$ amount from the estimated $NH_3$ amount.

In one embodiment, the temperature condition includes a temperature of the first catalyst portion. In another embodiment, the ANR diagnostic value includes a plurality of ANR diagnostic values greater than 1. In a refinement of this embodiment, estimating the $NH_3$ amount includes estimating a lower bound for a plurality of the $NH_3$ amounts in response to the plurality of ANR diagnostic values and the $NO_x$ amount to the inlet of the first catalyst portion. In a further refinement, the method includes filtering the plurality of lower bound values. In another refinement, the estimates for the lower bound for the plurality of $NH_3$ amounts are determined by the product of the $NO_x$ amount at the inlet of the first catalyst portion and the difference between an associated ANR diagnostic value and 1. In yet another refinement, the plurality of ANR diagnostic values range from about 1.1 to about 2.0.

In another embodiment, the first threshold for the temperature condition and the second threshold for the flow rate provide for substantial completion of a $deNO_x$ reaction of $NO_x$ in the exhaust gas over the first portion of the SCR catalyst. In a further embodiment, the temperature condition includes a temperature value of at least 350° C. in the first catalyst portion. In another embodiment, the temperature condition includes a temperature value of at least 390° C. in the first catalyst portion.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an internal combustion engine to produce an exhaust gas to an aftertreatment system including a selective catalytic reduction (SCR) catalyst having a first catalyst portion and a second catalyst portion downstream of the first catalyst portion, the aftertreatment system including an $NH_3$ sensor at a position between the first and second catalyst portions;
    enabling a diagnostic of the $NH_3$ sensor in response to a temperature condition of the SCR catalyst exceeding a first threshold and a flow rate of the exhaust gas being less than a second threshold;
    in response to enabling the diagnostic, estimating an $NH_3$ amount at the position of the $NH_3$ sensor in response to a $NO_x$ amount to an inlet of the first catalyst portion and a diagnostic ANR value greater than 1;
    injecting a reductant amount into the exhaust gas in response to the diagnostic ANR value and the $NO_x$ amount to the inlet of the first catalyst portion;
    measuring an $NH_3$ amount with the $NH_3$ sensor in response to injecting the reductant amount; and
    determining a fault condition of the $NH_3$ sensor in response to a deviation of the measured $NH_3$ amount from the estimated $NH_3$ amount.

2. The method of claim 1, wherein the temperature condition includes a temperature of the first catalyst portion.

3. The method of claim 1, wherein the first threshold for the temperature condition and the second threshold for the flow rate provide for substantial completion of a $deNO_x$ reaction of $NO_x$ in the exhaust gas over the first portion of the SCR catalyst.

4. The method of claim 1, wherein the temperature condition includes a temperature value of at least 350° C. in the first catalyst portion.

5. The method of claim 1, wherein the temperature condition includes a temperature value of at least 390° C. in the first catalyst portion.

6. The method of claim 1, wherein the ANR diagnostic value includes a plurality of ANR diagnostic values greater than 1.

7. The system of claim 6, wherein the plurality of ANR diagnostic values range from 1.1 to 2.0.

8. The method of claim 6, wherein estimating the $NH_3$ amount includes estimating a lower bound for a plurality of the $NH_3$ amounts in response to the plurality of ANR diagnostic values and the $NO_x$ amount to the inlet of the first catalyst portion.

9. The method of claim 8, further comprising filtering the plurality of lower bound values.

10. The method of claim 8, wherein the estimates for the lower bound for the plurality of $NH_3$ amounts are determined by the product of the $NO_x$ amount at the inlet of the first catalyst portion and the difference between an associated ANR diagnostic value and 1.

11. A system, comprising:
    an exhaust system for receiving an exhaust gas from operation of an internal combustion engine, the exhaust system including a selective catalytic reduction (SCR) catalyst including a first catalyst portion positioned upstream of a second catalyst portion;
    an $NH_3$ sensor coupled to the exhaust system at a position between the first and second catalyst portions operable to measure an $NH_3$ amount;
    a reductant injector coupled to the exhaust system at a position upstream of the first catalyst portion operable to provide a reductant amount in response to a reductant injection command;
    a $NO_x$ sensor upstream of the SCR catalyst configured to provide a signal representative of a $NO_x$ amount to an inlet of the first catalyst portion;
    a controller, comprising:

a diagnostic enablement module structured to enable a diagnostic of the $NH_3$ sensor in response to a temperature condition of the SCR catalyst exceeding a first threshold and a flow rate of the exhaust gas being less than a second threshold;

an ANR determination module structured to determine varying reductant amounts for injection by the reductant injector based upon the $NO_x$ amount in response to enablement of the diagnostic, wherein the varying reductant amounts provide a range of ANR diagnostic values;

an $NH_3$ estimation module structured to determine an estimate of a lower bound of $NH_3$ amounts at the position of the $NH_3$ sensor in response to the range of ANR diagnostic values and $NO_x$ amounts at the inlet to the first catalyst portion; and an $NH_3$ sensor diagnostic module structured to determine a fault condition of the $NH_3$ sensor in response to actual $NH_3$ amounts measured by the $NH_3$ sensor over the range of ANR diagnostic values deviating from the estimate of the lower bound of the $NH_3$ amounts by more than a threshold amount.

12. The system of claim 11, wherein the first threshold for the temperature condition and the second threshold for the flow rate provide for substantial completion of a $deNO_x$ reaction of $NO_x$ in the exhaust gas over the first portion of the SCR catalyst.

13. The system of claim 11, further comprising a diesel oxidation catalyst and a particulate filter upstream of the SCR catalyst.

14. The system of claim 11, wherein the temperature condition of the SCR catalyst is a temperature of the first catalyst portion.

15. The system of claim 14, wherein the temperature condition includes a temperature value of at least 350° C. in the first catalyst portion.

16. The system of claim 11, wherein the controller further comprises a diagnostic execution module structured to determine reductant dosing commands that provide the varying reductant amounts.

17. The system of claim 16, wherein the ANR diagnostic values range from 1.1 to 2.0.

18. The system of claim 11, wherein the estimate of the lower bound of the $NH_3$ amounts is determined by the product of the $NO_x$ amount at the inlet of the first catalyst portion and the difference between an associated ANR diagnostic value and 1.

19. The system of claim 18, wherein the $NH_3$ estimation module is further structured to filter the estimate of the lower bound of $NH_3$ amounts.

20. The system of claim 19, wherein the $NH_3$ concentration estimation module is further structured to filter the estimate of the lower bound of $NH_3$ amounts with the filter having a time constant selected in response to a size of the first catalyst portion and the flow rate of the exhaust gas.

\* \* \* \* \*